United States Patent [19]
Little

[11] Patent Number: 6,024,444
[45] Date of Patent: Feb. 15, 2000

[54] EYEWEAR LENS RETENTION APPARATUS AND METHOD

[75] Inventor: Andrew J. Little, Fairport, N.Y.

[73] Assignee: Luxottica Leasing S.p.A., Agordo, Italy

[21] Appl. No.: 09/215,825

[22] Filed: Dec. 18, 1998

[51] Int. Cl.[7] .................................................. G02C 1/00
[52] U.S. Cl. .............................................. 351/86; 351/83
[58] Field of Search ............................... 351/92, 96, 90, 351/91, 83, 86, 103, 106, 41

[56] References Cited

U.S. PATENT DOCUMENTS

| | | | |
|---|---|---|---|
| 2,208,103 | 7/1940 | Paterson | 88/47 |
| 2,588,505 | 3/1952 | Ellis | 88/47 |
| 2,668,291 | 2/1954 | Schauweker | 2/14 |
| 3,552,840 | 1/1971 | Braget | 351/154 |
| 3,824,006 | 7/1974 | Voit | 351/106 |
| 3,884,561 | 5/1975 | Kodys | 351/83 |
| 3,958,867 | 5/1976 | Morgan | 351/47 |
| 4,135,792 | 1/1979 | Deeg | 351/41 |
| 4,196,982 | 4/1980 | Watkins | 351/86 |
| 4,340,282 | 7/1982 | Murakami | 351/154 |
| 4,427,271 | 1/1984 | Fogg | 351/154 |
| 4,834,523 | 5/1989 | Porsche | 351/57 |
| 4,842,399 | 6/1989 | Tsai | 351/106 |
| 5,064,463 | 11/1991 | Ciomek | 75/314 |
| 5,387,949 | 2/1995 | Tackles | 351/121 |
| 5,400,089 | 3/1995 | Danloup | 351/92 |
| 5,441,695 | 8/1995 | Gladden | 419/37 |
| 5,523,804 | 6/1996 | Nolan | 351/43 |
| 5,541,674 | 7/1996 | Jannard | 351/41 |

*Primary Examiner*—Hung Xuan Dang
*Attorney, Agent, or Firm*—Katherine McGuire

[57] ABSTRACT

Lens retention in an eyewear having a front frame having continuous rim type right and left eye openings each having a substantially L-shaped cross-section formed of any desired material. A lens having a beveled edge is placed in a respective eye opening with the apex of the bevel abutting the inner surface of the side wall of the eye opening which thereby forms an adhesive trough at the rear surface of the lens. A bead of UV-curable adhesive is applied within the trough which thereby firmly secures the lens within the eye opening.

20 Claims, 4 Drawing Sheets

EYEWEAR LENS RETENTION APPARATUS AND METHOD

CROSS-REFERENCE TO RELATED APPLICATIONS

Reference is made to the following copending, commonly assigned patent applications, all filed on Dec. 18, 1998, and the disclosures of each of which are incorporated herein by reference:
1) RAPID TOOLING FOR METAL INJECTION MOLDING, having Ser. No. 09/216,364;
2) RUNNER AND GATE SYSTEM IN AN INJECTION MOLDING APPARATUS, having Ser. No. 09/215,832;
3) APPARATUS AND METHOD FOR FORMING AN UNDERCUT IN A MOLDED PRODUCT, having Ser. No. 09/216,243;
4) PROCESS FOR POWDER INJECTION MOLDING PARTS HAVING HIGH ASPECT RATIOS AND PARTS FORMED THEREBY, having Ser. No. 09/216,365;
5) PROCESS FOR SHAPING AND CONSOLIDATING METAL POWDERS TO FORM PARTS HAVING HIGH ELASTICITY, having Ser. No. 09/217,246; and
6) SINTERING CARRIER, having Ser. No. 09/216,335.

BACKGROUND OF THE INVENTION

The present invention relates to eyewear, and more particularly relates to retaining a lens in an eyewear frame.

Eyewear frames have traditionally been formed from either a shaped metal wire or a molded polymer, with either a glass or polymeric lens (unitary or dual) being fitted to the frame. Retaining a lens in the frame requires that the lens fit the frame with as close a tolerance as possible so that the lens does not unintentionally release from the frame. While a close tolerance is desired, it is also important that no damaging or distorting stresses be placed on the lens, whether it be a corrective (Rx) or non-corrective lens. It is furthermore many times desired that the lens be replaceable upon the frame to permit replacement of a damaged lens, or switching by the consumer between different types of lenses (e.g., lenses having different coatings) on the same frame.

It will be appreciated that these criteria are competing in the respect that optimizing one of the criteria tends to de-optimize one or both of the other criteria. This is especially evident when one considers the plethora of alternate lens-retention techniques disclosed in the prior art which strive to optimize all three of these criteria in one design. Some known lens-retention techniques used with traditional frame constructions, including those of the split-frame, continuous rim, semi-rimless, and rimless type, are as follows.

In metal wire frames, a split-frame configuration is common. In this construction, a metal eyewire is formed by passing a wire feedstock through appropriate dies which form the wire into the desired cross-section. At this time, an eyewire groove, usually V-shaped in section, is formed wherein the bevel of the lens edge is fit. The eyewire is then passed through a bending station wherein it is bent into the desired outline and is then cut, thereby leaving two free ends to which are brazed or soldered endpieces or "rim locks" as they are termed in the art. The eyewire is separable at the free ends thereof to permit opening of the eyewire a distance sufficient to permit insertion of the lens, with the eyewire then closed about the lens and the free ends thereof secured together with a screw which extends through the endpieces on the eyewire. A protective gasket or adhesive is sometimes applied between the groove and lens edge. See, e.g., U.S. Pat. Nos. 3,824,006 to Voit; 4,340,282 to Murakami; and 4,427,271 to Bausch & Lomb Incorporated (applicant herein).

In semi-rimless frame constructions, one commonly used method of retaining the lens in the frame uses a strong, thin cord which is fixed at one end of the frame, wraps under the bottom edge of the lens while engaging a groove formed in the bottom lens edge. The other end of the cord is then releasably fixed to the other side of the frame, thereby securing the lens to the frame. See, for example, U.S. Pat. No. 4,842,399.

In rimless eyewear constructions, a front frame is absent, and the lenses are directly attached to the temple and bridge components of the eyewear. In this type of construction, holes or other openings are usually formed in the lens wherethrough fastening devices are passed to secure the components together. See, for example, U.S. Pat. Nos 2,208, 103, 2,588,505 and 2,668,291.

Still other lens-retaining methods feature either a recessed portion or a projection formed on the edge of the lens which mates with a complementary feature on the frame. See, e.g., U.S. Pat. Nos. 4,834,523 to Porsche; 5,523,804 to ;5,387, 949 to Oakley, Inc.; and 5,400,089 to Essilor. While mechanically strong, this type of lens securement requires machining or molding complex features on the lens and frame which are expensive to manufacture.

In plastic frame eyewear, a continuous rim frame construction is common. In this type of frame, the lens is snapped into the respective eye opening of the plastic frame, usually with the use of heat to temporarily expand the plastic frame. This is known in the art as tension mounting, which is usually not possible with non-yielding metal frames. As with metal eyewire frames, however, the beveled edge of the lens fits within a groove formed in the perimeter of the eye opening. See, for example, U.S. Pat. Nos. 3,884,561 and 4,196,982.

Another lens-retention method used in continuous rim type frames (of both plastic and metal construction) uses either a rigid or flexible retaining ring which follows the contour of the lens opening in the frame, and is fit against the lens in the frame, sandwiching the lens edge between the frame and retaining ring. The retaining ring itself is secured to the frame by either a press-fit or with an adhesive, for example. See, e.g., U.S. Pat. Nos. 3,552,840 to Braget; 3,958,867 to Morgan; 5,541,674 to Oakley, Inc.; and French Pat. No. 1,126,329. The problem remains, however, that the retaining ring would be an added expense to the manufacturing process, especially since it must be very closely matched to the contour of the eye opening to provide a secure fit. The retaining ring itself could also unintentionally release from the frame, thereby allowing the lens to fall from the frame.

Yet another example of lens retention in a continuous plastic frame is seen in U.S. Pat. No. 4,135,792 issued to American Optical Corporation on Jan. 23, 1979. The passage found therein beginning at Col. 2, In. 59 and ending at Col. 3, In. 8 describes a lens retaining method wherein the eye openings of the frame are provided with an "L" shape cross-section providing a flat lens-receiving seat 24. Lens 16 is provided with a matching flat edge about the full periphery thereof and cemented in place with an epoxy or other plastic cement. Since the invention of the '792 patent is directed toward a plastic frame and plastic lens each having the same or lower tensile elastic modulus, the specification further states: "Problems relating to conventional differential expansion of spectacle frame fronts and lenses having been obviated, a secure and permanent connection between lens and frame can thus be accomplished." The lens retention method of the '792 patent is therefore limited to plastic: frames and plastic lenses of the type disclosed therein since the matching flat edges of the lens and lens-receiving seat of the frame cannot accommodate differential expansions and contractions of the frame with respect to the lens. It is furthermore evident that the matching flat edges of the lens edge and frame would complicate even curing of the epoxy, especially if the material is of the UV-curable type since UV light would not be able to penetrate the lens and frame uniformly, if at all, to reach the epoxy layered between the flat lens edge and frame. Still another potential problem is the inability to control the thickness of the epoxy layer, which in this instance is dictated by the difference between the diameter of the lens and that of the frame opening.

SUMMARY OF THE INVENTION

The present invention is directed toward a method for retaining a lens in a frame of the grooveless, continuous rim type regardless of the type of material from which the frame and lens are formed (e.g., metal or plastic construction), and which method optimizes, in a way not heretofore realized, each of the lens retention criteria outlined above.

The frame of the invention is formed with a pair of eye openings wherein a respective lens is placed. Each eye opening of the front frame is formed by a side wall and a front wall extending substantially perpendicularly from the forward-most edge of a respective side wall such that the side wall and front wall together form a substantially L-shaped cross-section about the full perimeter of each eye opening. The side wall has a diameter larger than the diameter of the corresponding lens such that the lens may be inserted into the eye opening from the rear, and placed against the front wall of the frame which faces front when the eyewear is worn.

The lens edge is provided with a bevel which is a feature found on most lenses which mate with a grooved frame eye opening to secure the lens to the frame. In the instant invention, however, the lens bevel does not fit within a groove, but rather resides in a location adjacent to the intersection of the side wall and front wall of the respective eye opening. The juncture of the lens bevel and the frame side wall forms an "adhesive trough" about the full periphery of the lens and frame opening. The adhesive trough is thus formed when the lens is placed in the frame eye opening and is readily accessible from the rear of the frame. An adhesive bead having a viscosity and other properties meeting criteria to be explained is then deposited about the perimeter of the lens in the adhesive trough. The adhesive bead is allowed to cure, for example by UV curing which achieves very good curing results since the adhesive bead is completely exposed at the rear of the frame, thus securing the lens to the part of the sidewall of the frame forming the adhesive trough. This firmly secures the lens to the frame.

The lens retention method of the invention provides a lens retention which passes all the appropriate product failure testing (e.g., drop balling a ⅝" diameter steel ball from 50" onto the center of the lens without the lens releasing from the frame). No other retention mechanism is needed, such as the separate retaining ring used in the prior art patents listed above. The present invention thus provides a lens-retention method for grooveless eyewear frames having an L-shaped cross-section formed of any desired material (e.g., plastic or metal) which is inexpensive to manufacture, aesthetically pleasing, and superior in reliability than other known methods.

DETAILED DESCRIPTION

Figure 1:
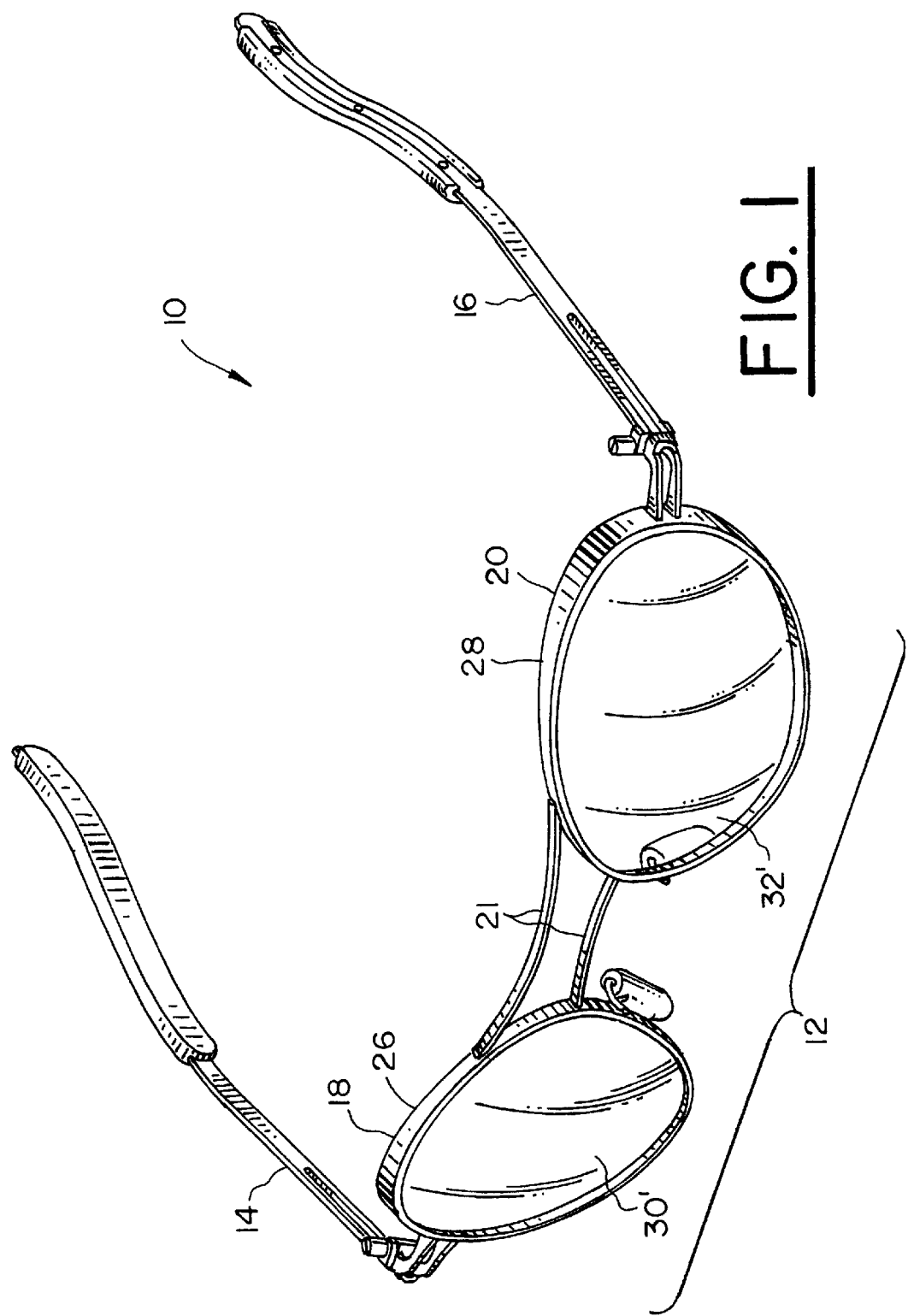
FIG. 1 is a front perspective view of an eyewear employing the method of the present invention.
Figure 5:
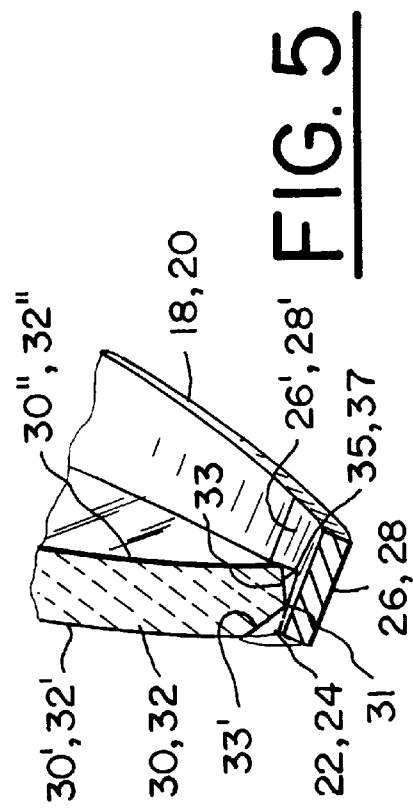
FIG. 5 is a cross-sectional view taken generally along the line 5—5 in FIG. 2.

Referring to the drawing, there is seen in FIG. 1 an eyewear 10 having a front frame 12 and temple members 14, 16 which are pivotally connected to either end of front frame 12 using any known means. Frame 12 comprises right and left eye openings 18,20 joined by a bridge 21. Eye openings 18,20 are of the continuous rim type, with each being defined by a front wall 22,24 and side wall 26,28 which extend substantially perpendicularly to each other, respectively, thereby each forming a substantially L-shaped cross-section as seen in FIG. 5. It is noted eye openings 18,20 are substantially identical to each other such that description of features of one eye opening herein applies to the other eye opening as well.

As stated above, each eye opening 18,20 is of the continuous rim type which means it completely surrounds a respective lens when a lens is placed therein in the manner to be described. Eye openings 18,20 may be formed from any desired material (e.g., plastic, metal, including combinations thereof, etc.) and may be formed using any desired process (e.g., molding, casting, machining, etc.). It will also be appreciated that the eye openings 18,20 (as well as the other components of the eyewear 10) may be formed of any desired shape, and are therefore not limited to the exact configurations shown and described herein.

Figure 2A:
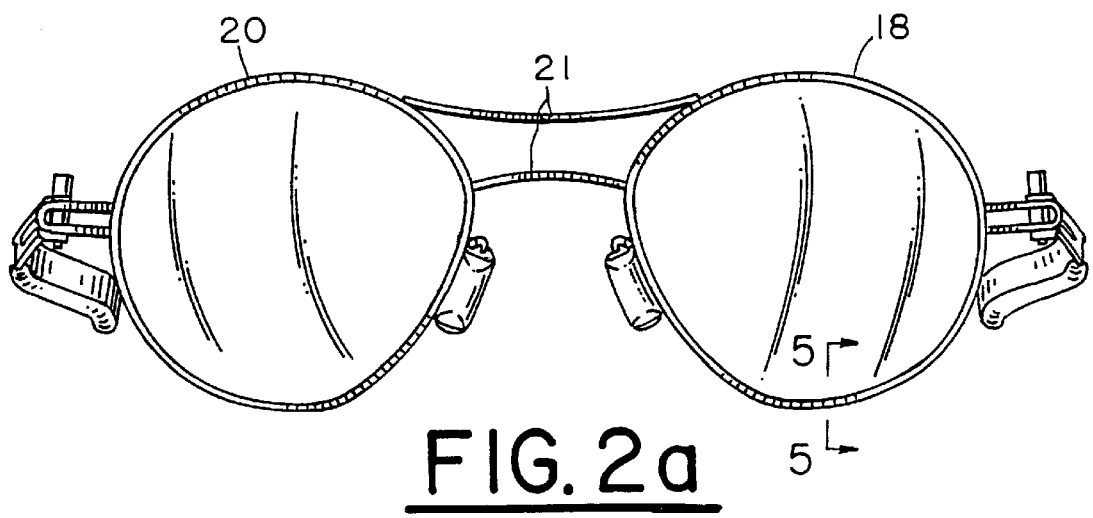
FIGS. 2a and b are rear and front elevational views thereof, respectively.
Figure 2B:
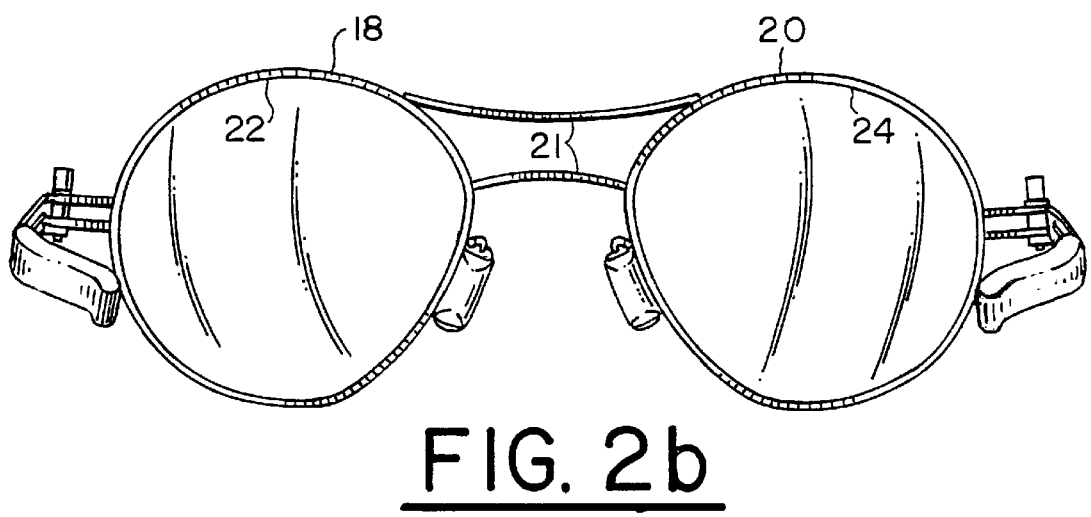
Figure 3:
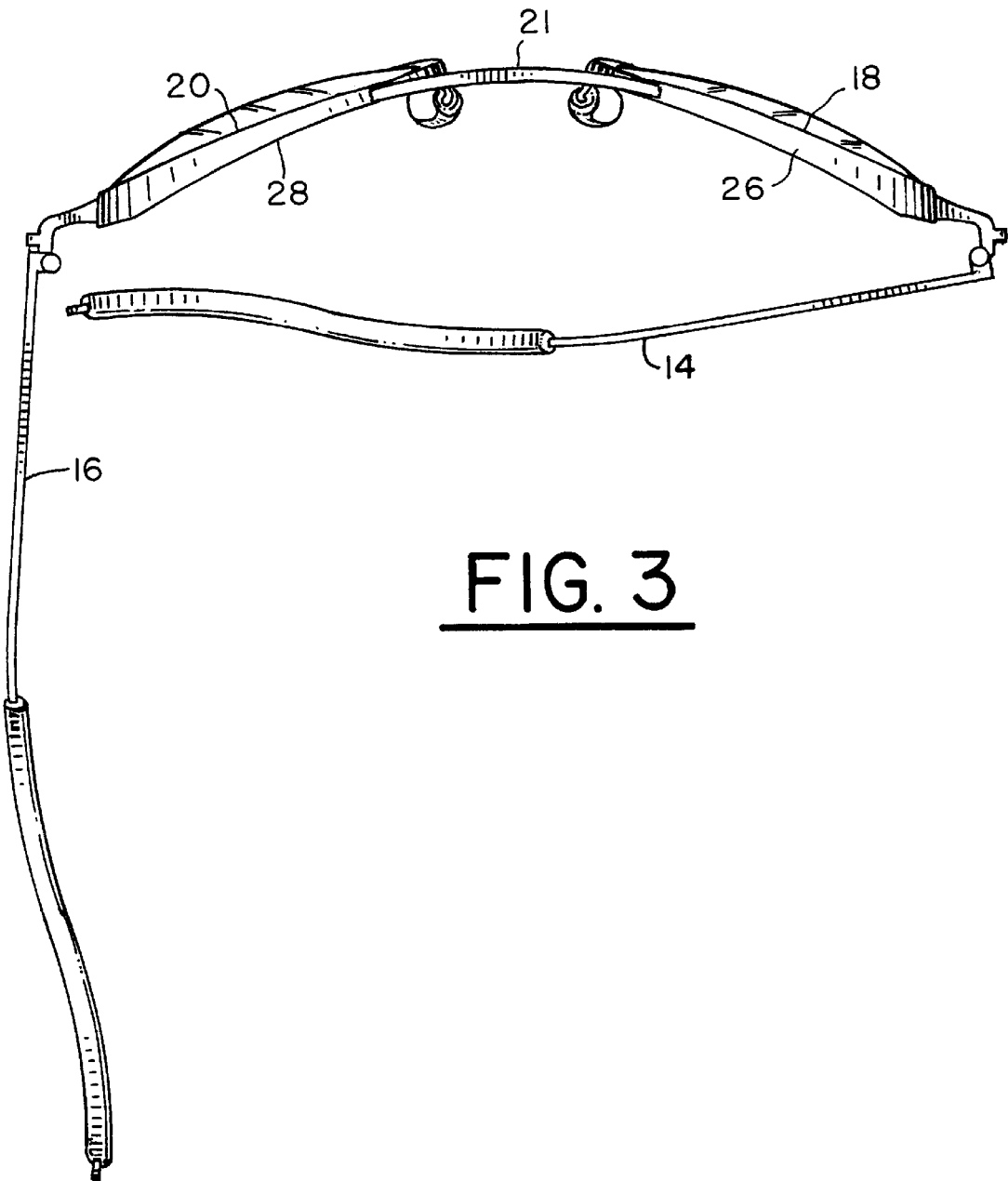
FIG. 3 is a top plan view thereof.
Figure 4:
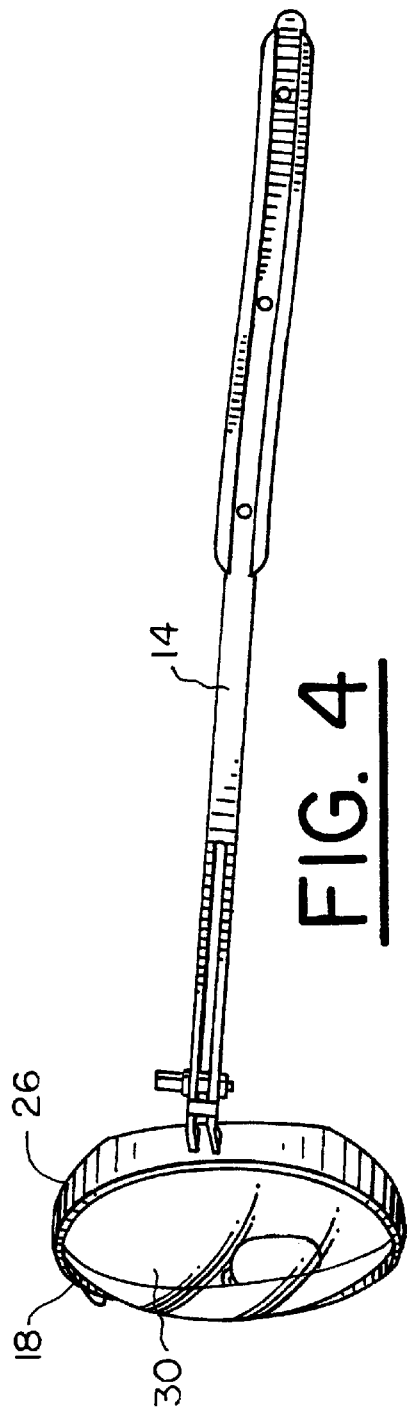
FIG. 4 is a side, elevational view thereof.

When the eyewear is worn, front walls 22,24 face the front, away from the face of the user (FIG. 2), with side walls 26,28 extending rearwardly therefrom (FIGS. 1, 3, 4 and 5). Right and left lens 30,32 are placed into eye openings 18,20 from the rear, with the diameter of the opening defined by side walls 26,28 being sufficient to clear each lens 30,32 past side walls 26,28 but not past front walls 22,24 which are of smaller diameter than lens 30,32. In the fully inserted position of lens 30,32, the outer, convexly curved surfaces 30',32' thereof face forwardly with the apex 31 of the bevel of each lens 28,30 abutting the inner surface 26',28' of side wall 26,28 adjacent front wall 22,24 (FIG. 5). In this position, apex 31, rear bevel surface 33 and side wall inner surface 26',28' together form an adhesive trough 35 which extends around the full periphery of lens 30,32. To secure the lens 30,32 within eye opening 18,20, respectively, an adhesive bead 37 is deposited in adhesive trough 35 and allowed to cure.

The adhesive bead 37 may be of any suitable type, but is preferably either an acrylic or epoxy which is UV-curable and able to withstand large temperature variations (e.g., from 40° below zero to over 100° Fahrenheit). Other preferable characteristics of adhesive bead 37 are that it is detergent and UV resistant, is substantially tack-free (i.e., it doesn't pick up dust or lint), and is flexible to accommodate variations in contraction and expansion of the lens 30,32 with regard to the eye opening 18,20. It is furthermore preferred that the adhesive is self-leveling and has a viscosity in the uncured state preferably in the range of 5,000 to 20,000 cP (centiPoise), and most preferably approximately 10,000 cP at room temperature. As such, the adhesive will not be overly fluid so as to be able to pass between the lens bevel apex 31 and side wall surface 26',28', nor so thick as to not uniformly fill and self-level within adhesive trough 35. In this regard, it is noted that it is preferred the adhesive not seep past apex 31 to a location between the lens front bevel surface 33' and front wall 22,24. This is so since adhesive at this location would be acting in tension which is not as good a strength component as when adhesive is acting in strain as it does when located in adhesive trough 35. In this regard, it will be appreciated that the lens edge is retained on the front side thereof by front wall 22,24 and on the rear side thereof by adhesive bead 37. Therefore, any force applied to lens 30,32 in a direction away from front wall 18,20 imparts both compression and strain components to adhesive bead 37 which provides an extremely strong and effective counter force to retain lens 30,32 within eye opening 18,20, respectively.

What is claimed is:

1. A method for securing a lens to a grooveless eye opening, said lens having a beveled edge extending about the full periphery thereof, said beveled edge including a bevel apex and forward and rear bevel surfaces lying on opposite sides of said bevel apex, said eye opening having a front wall and a side wall extending substantially perpendicularly from the front wall, said front and side walls each having an inner and outer surface, said method comprising the steps of:

a) inserting said lens into said eye opening with said bevel apex abutting said side wall inner surface, said bevel apex, said bevel rear surface and said side wall inner surface together forming an adhesive trough extending about the fill periphery of said lens;

b) applying a bead of adhesive within said adhesive trough; and c) curing said adhesive bead, said adhesive thereby securing said lens within said eye opening.

2. The method of claim 1 wherein said adhesive has an uncured viscosity in the range of 5,000 to 20,000 cP.

3. The method of claim 1 wherein said adhesive has an uncured viscosity of 10,000 cP.

4. The method of claim 1 wherein said adhesive is an epoxy.

5. The method of claim 1 wherein said adhesive is an acrylic.

6. The method of claim 1 wherein said adhesive is UV-curable.

7. The method of claim 1 wherein said adhesive is substantially optically transparent.

8. The method of claim 1 wherein said eye opening is formed by molding.

9. The method of claim 8 wherein said eye opening is formed by injection molding.

10. The method of claim 9 wherein said eye opening is made of metal.

11. The method of claim 10 wherein said eye opening is made of titanium.

12. The method of claim 10 wherein said eye opening is made of stainless steel.

13. Eyewear comprising:

a) a front frame having right and left eye openings each defined by a front wall and side wall extending substantially perpendicularly to said front wall, each of said front and side walls having an inner and outer surface;

b) a right and left lens for fitting to said right and left eye openings, respectively, each of said right and left lenses each including a beveled edge extending about the full periphery thereof, each said beveled edge having a bevel apex and a front and rear bevel surface lying on opposite sides of said bevel apex, said right and left lens being inserted into said right and left eye openings with said bevel apex abutting said side wall inner surface and thereby forming an adhesive trough between said bevel rear surface and said side wall inner surface; and c) an adhesive bead applied within said adhesive trough, said adhesive bead operable to fix said right and left lens within said right and left eye opening, respectively.

14. The eyewear of claim 13 wherein said edge of said right and left lenses is sandwiched between said front wall inner surface and said adhesive bead of said right and left eye opening, respectively.

15. The eyewear of claim 14 wherein said adhesive is an epoxy.

16. The eyewear of claim 14 wherein said adhesive is an acrylic.

17. The eyewear of claim 14 said adhesive is substantially optically transparent.

18. The eyewear of claim 14 wherein said adhesive is UV curable.

19. The eyewear of claim 14 wherein said adhesive has an uncured viscosity of about 5,000 to 20,000 cP.

20. The eyewear of claim 14 wherein said adhesive has an uncured viscosity of about 10,000 cP.

* * * * *